United States Patent [19]
Jordan et al.

[11] 4,073,378
[45] Feb. 14, 1978

[54] AUTOMATIC TOBACCO HARVESTER WITH IMPROVED LEAF CONVEYING SYSTEM

[75] Inventors: Bertram Lee Jordan; John Davis Mitchell, both of Lewiston, N.C.

[73] Assignee: Harrington Manufacturing Company, Lewiston, N.C.

[21] Appl. No.: 706,612

[22] Filed: July 19, 1976

[51] Int. Cl.² .................................................. B65G 15/14
[52] U.S. Cl. ........................................ 198/627; 56/27.5
[58] Field of Search ............... 198/626, 627, 628, 840; 56/27.5

[56] References Cited

U.S. PATENT DOCUMENTS

| | | | |
|---|---|---|---|
| 1,232,229 | 7/1917 | Crane | 198/628 |
| 1,241,706 | 10/1917 | Bussey | 198/628 |
| 1,254,953 | 1/1918 | White | 198/628 |
| 1,624,703 | 4/1927 | Witte | 198/628 |
| 2,133,727 | 10/1938 | Stande | 198/628 |
| 2,197,135 | 4/1940 | Schulze | 198/627 |
| 2,320,667 | 6/1943 | Smith | 198/840 |
| 3,448,848 | 6/1969 | Washburn | 198/628 |
| 3,731,475 | 5/1973 | Balthes | 56/27.5 |
| 3,841,071 | 10/1974 | Pinkham et al. | 56/27.5 |
| 3,902,304 | 9/1975 | Mitchell et al. | 56/27.5 |

*Primary Examiner*—Evon C. Blunk
*Assistant Examiner*—Richard K. Thomson
*Attorney, Agent, or Firm*—Mills & Coats

[57] ABSTRACT

The present invention relates to an automatic tobacco harvester having a longitudinal leaf conveyor system for receiving tobacco leaf material defoliated by a defoliator assembly carried by said harvester and generally conveying the received leaf material rearwardly and upwardly about said harvester where the longitudinal conveyor system discharges the leaf material therefrom about a rearward elevated area on said harvester. The longitudinal leaf conveyor system of a particular harvester includes a series of laterally spaced longitudinal conveyor assemblies, each conveyor assembly including a horizontal conveyor section for conveying the leaf material from the defoliator assembly towards the rear of said harvester, and an elevating section which acts to convey the leaves from the horizontal section upwardly therefrom to an elevated area on said harvester where the leaves are discharged therefrom. The elevated section of each longitudinal conveyor assembly includes a pair of adjacently disposed endless leaf elevating conveyors that cooperate to convey tobacco leaves therebetween to the elevated area of discharge. The endless leaf elevating conveyors include a lower disposed wire chain type conveyor and an upper slightly flexible belt conveyor, the belt conveyor being trained around a lower roller that is movably mounted relative to the adjacent wire chain conveyor for allowing a leaf entry area defined therebetween to be varied in accordance with various masses and volumes of tobacco leaf material entering between said wire chain and belt elevating conveyors.

3 Claims, 8 Drawing Figures

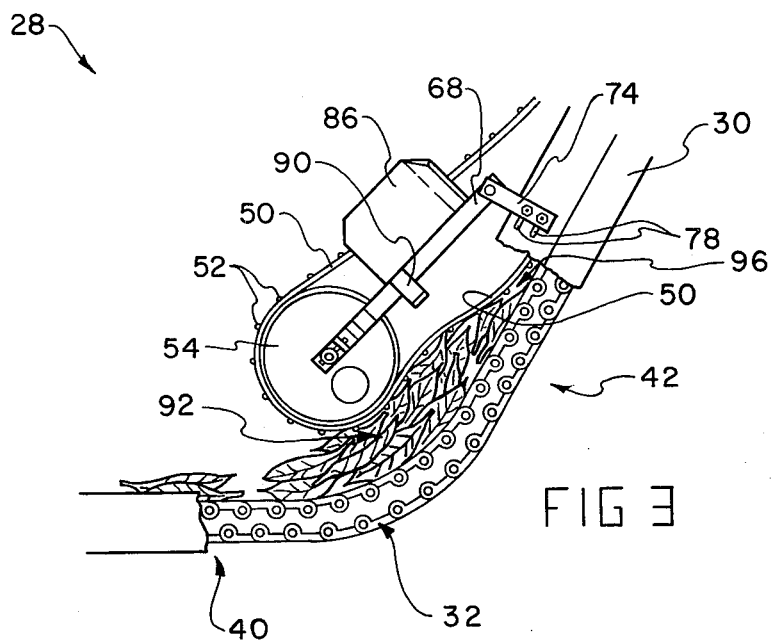
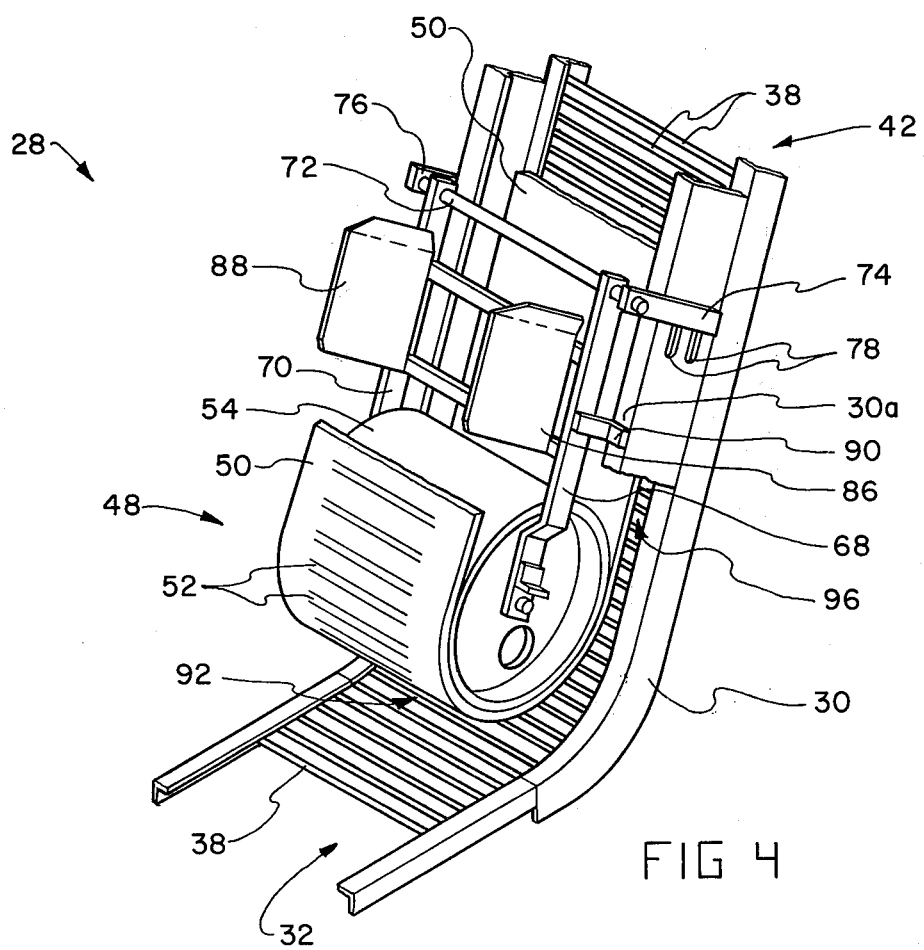

AUTOMATIC TOBACCO HARVESTER WITH IMPROVED LEAF CONVEYING SYSTEM

The present invention relates to agricultural harvesting equipment, and more particularly to automatic tobacco harvesters of the type having conveying means associated therewith for conveying tobacco leaf material generally rearwardly and upwardly about said harvester to an upper elevated area where the tobacco leaf material is discharged into a tobacco leaf collecting receptacle or onto a cross conveyor, or the like.

BACKGROUND OF THE INVENTION

In the past several years, automatic tobacco harvesters have met with substantial commercial success and have been widely accepted by tobacco farmers, especially in flue-cured tobacco growing areas. Harrington Manufacturing Company of Lewiston, North Carolina, is now presently producing and marketing one row and two row self-propelled automatic tobacco harvesters or combines, as well as a pull type automatic tobacco harvester just recently introduced. The basic design and function of such automatic tobacco harvesters is well known and appreciated by those skilled in the art. But for a unified and complete understanding of automatic tobacco harvesters and the manner in which they operate, one is referred to the disclosure found in U.S. Pat. No. 3,841,071 granted to Jesse R. Pinkham et al on Oct. 15, 1974, this patent being expressly incorporated herein by reference.

From a review of a conventional automatic tobacco harvester, it is appreciated that the same includes a main frame, at least one defoliator assembly carried thereby for defoliating leaves from respective stalks of a row during the harvesting operation, and a conveyor system for receiving defoliated leaves and generally conveying the leaves rearwardly and upwardly about the harvester to where the leaves are discharged from an upper rearward elevated area into a leaf collecting receptacle such as a trailer or a box type container, or onto a cross conveyor where the leaves may be conveyed into a trailer being pulled through the field during the harvesting operation. In reviewing the Pinkham et al patent referred to above, it is seen that a part of the leaf conveying means provided for comprises a longitudinal conveyor assembly that comprises an endless wire chain conveyor that extends generally horizontal adjacent the defoliator assembly, after which the wire chain conveyor assembly is inclined upwardly towards the rear of the harvester and terminates about an rearward elevated end. The upwardly inclined section of the wire chain conveyor assembly is provided with a series of rollers that are generally driven by the frictional engagement of the upper run of the wire chain conveyor assembly therewith during the conveying operation, and wherein the tobacco leaf material being elevated is generally conveyed between the respective upper rollers and the upper run of the wire chain conveyor assembly that forms a part of the inclined or leaf elevating portions of the longitudinal conveyor assembly means of said tobacco harvester.

SUMMARY OF THE INVENTION

The present invention relates to a new and improved leaf elevating conveyor system for automatic tobacco harvesters that is particularly designed to improve the overall harvesting efficiency of the automatic tobacco harvester as well as to minimize leaf bruising and damage to the leaves during the conveying operation. With the emergence of the two-row harvester the capacity of the harvester obviously increased substantially. The increased capacity of the self-propelled two-row harvester brought to light the need for an improved leaf conveying system to efficiently handle this increased capacity.

While generally tobacco leaf material is delivered to the longitudinal conveyor system uniformly, it is not uncommon for a relatively large mass or bunch of tobacco leaves to be delivered to the same general area on said longitudinal conveyor system. Often it is difficult to elevate such large masses or bunches of leaves without encountering problems in that the vertical elevating section of the conveyor system is proned to clog or jam, or in some cases the leaves tend to fall from the conveyor system during the vertical lift.

In the case of the preferred embodiment shown herein, the leaf elevating conveying assembly of the automatic tobacco harvester comprises two adjacently disposed leaf elevating conveyors, one being an upper endless belt conveyor and the other during a lower endless wire chain type conveyor with the two cooperative to convey tobacco leaves therebetween as the inner adjacent runs of each of the two conveyors tend to hold and support the leaves and run generally from a lower level of the harvester to an upper elevated area where the leaves are discharged therefrom. The upper belt conveyor is slightly flexible allowing it to bulge to hold the relatively large masses of tobacco leaves that may pass between the belt conveyor and the lower wire chain conveyor assembly extending about the vertical lift section of each respective longitudinal conveyor assembly of the automatic tobacco harvester.

In addition, the upper belt conveyor is provided with a lower idler roller that is rotatively mounted within a frame support structure that is pivotably mounted about the vertical leaf elevating section of a respective longitudinal conveyor assembly such that a defined entry area between said lower roller of said belt conveyor and the adjacent wire chain conveyor assembly can be varied such that relatively large masses or bunches of tobacco leaves can enter without clogging or jamming the conveyor system. More particularly, the lower roller of the upper belt conveyor is so disposed with respect to the longitudinal conveyor assembly that the tobacco leaf material itself in entering said entry area tends to urge the lower roller outwardly from the adjacent wire chain conveyor assembly.

It is, therefore, an object of the present invention to provide an automatic tobacco harvester with a leaf conveying and elevating conveyor system that is capable of efficiently handling relatively large capacities of tobacco leaf material in a manner that minimizes leaf bruising and damage.

Another object of the present invention is to provide an improved leaf elevating conveyor assembly for an automatic tobacco harvester that allows dirt and debris to be separated from the tobacco leaf material during the leaf elevating process, but which gently and firmly conveys the tobacco leaf material from a lower level to an upper rearward discharge area with a positive and swift conveying action.

Still a further object of the present invention is to provide a leaf elevating conveyor assembly having two adjacently disposed endless leaf elevating conveyors having inner runs that define a leaf conveying and passing area therebetween in which the lower conveyor assembly of the two is comprised of a wire chain type conveyor and the other upper conveyor is of a generally flexible belt type wherein the inner runs of the belt and wire chain conveyor serve in cooperative fashion to transfer the leaves from a lower level, with respect to said harvester, to an upper elevated area for discharge.

Another object of the present invention is to provide a leaf elevating conveyor assembly of the type referred to above comprising said two cooperative conveyor assemblies of the belt and wire chain type conveyors wherein said belt conveyor is provided with a lower idler roller that is supported within a movable frame such that the leaf entry area between the belt and wire chain conveyors may be varied in response to various sizes and volumes of tobacco leaf material entering the leaf elevating conveyor assembly which tends to prevent clogging or jamming due to such relatively large masses or bunches of tobacco leaf material.

A further object of the present invention resides in the provision of a leaf elevating conveyor assembly for an automatic tobacco harvester having a rear elevated terminal discharge end that allows relatively large masses or bunches of tobacco leaf material to be discharged therefrom without jamming or clogging.

Other objects and advantages of the present invention will become apparent from a study of the following description and the accompanying drawings which are merely illustrative of the present invention.

BRIEF DESCRIPTION OF THE DRAWINGS

FIG. 3 is a fragmentary side elevational view as described with respect to FIG. 2 with this particular view illustrating the movement of said lower roller to an outer position to accommodate the passing of a relatively large mass of tobacco leaf material thereunder.

FIG. 4 is a fragmentary perspective view of the lower portion of the leaf elevating conveyor assembly of the present invention with a portion of the upper run of the upper disposed belt being removed to better illustrate the structure of the pivotable frame structure that supports said lower roller.

DESCRIPTION OF PREFERRED EMBODIMENT

Figure 1:
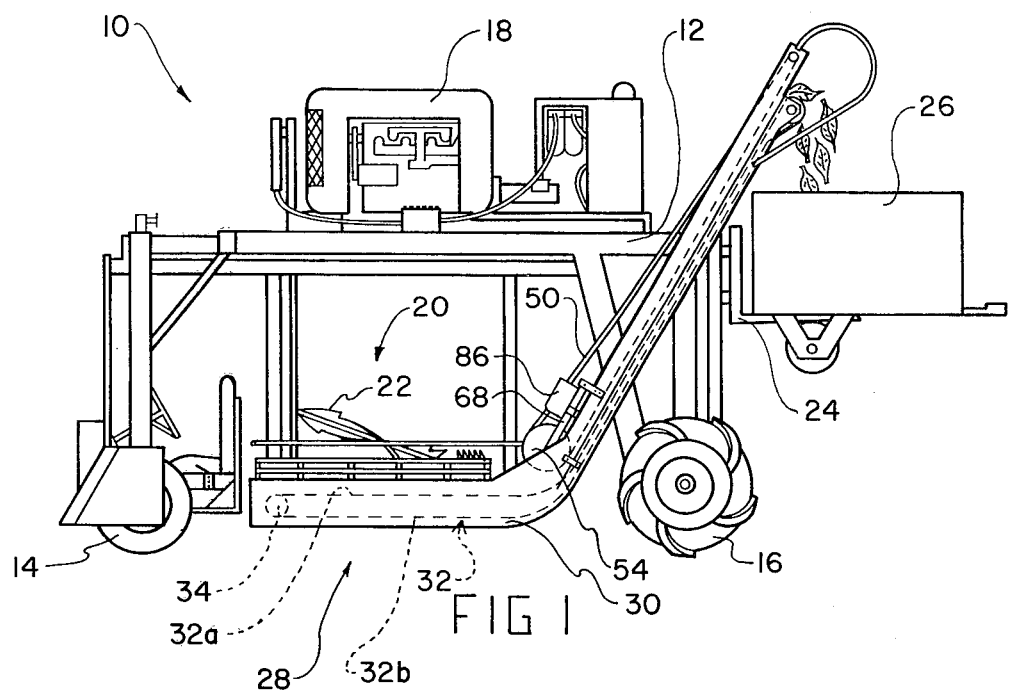
FIG. 1 is a side elevational view of a self-propelled automatic tobacco harvester having the improved leaf elevating conveyor system of the present invention associated therewith.

With further reference to the drawings, particularly FIG. 1, an automatic tobacco harvester of the high clearance self-propelled type is shown therein and indicated generally by the numeral 10. Although the basic design and function of such an automatic tobacco harvester is well known and appreciated by those skilled in the art, a brief and general discussion will follow dealing with the automatic tobacco harvester generally.

In this regard, it is seen that the automatic tobacco harvester shown in FIG. 1 includes a main frame 12 having a pair of front wheels 14 and a pair of rear wheels 16 (only one front and rear wheel being shown because of the nature of FIG. 1). Mounted to main frame 12 is an engine 18 that is adapted to provide power to the harvester 10 and the driving components thereof, it being noted that basically such automatic tobacco harvesters are hydrostatically driven and the working components thereof hydraulically powered.

Tobacco harvester 10 includes a defoliator assembly or defoliator means, indicated generally by the numeral 20, suspended from main frame 12 and including hydraulic drive means (not shown) for driving a pair of laterally spaced defoliators 22 during the harvesting operation. Disposed about the rear end of harvester 10 is a hydraulically controlled and actuated fork lift 24 that may be moved vertically up and down within a rear guide channel structure such that the same may be used to support and elevate a trailer 26 from a ground engaging position to an elevated position for receiving tobacco leaves being conveyed thereto during the harvesting operation.

In the tobacco harvesting operation, the tobacco harvester 10 is powered through the field and defoliators 22 act to defoliate leaves from certain portions of the stalk. Some conventional automatic tobacco harvesters employ lateral conveying means adjacent each side of defoliator assembly 20 so as to convey the leaves outwardly from the defoliator assembly. Other harvesters position the longitudinal conveyors directly adjacent the defoliator assembly for receiving the leaves.

For a more complete and unified understanding of automatic tobacco harvesters and the basic design and operation thereof, one is referred again to U.S. Pat. No. 3,841,071 to Jesse R. Pinkham et al, the disclosure thereof being expressly incorporated herein by reference.

To convey the defoliated tobacco leaves from adjacent the defoliator assembly 20 into trailer 26 or other leaf collecting receptacle or even onto a cross conveyor, the automatic tobacco harvester 10 is provided with a longitudinal leaf conveying system that basically comprises a plurality of laterally spaced longitudinal conveyor means 28. With respect to a conventional automatic tobacco harvester such as shown in FIG. 1, such longitudinal conveyor means are particularly spaced so as to extend along and adjacent the defoliator assembly or defoliator assemblies depending on the capacity of the harvester and particularly the number of rows that the machine will harvest.

With particular reference to the structure and function of a particular longitudinal conveyor means or assembly 28, it is seen that the same basically extend from an area adjacent the front of the defoliator assembly 20 rearwardly along and adjacent the defoliator assembly to an area rearwardly thereof, at which point the longitudinal conveyor means is inclined upwardly and slightly rearwardly in the case of the embodiment shown in FIG. 1, where the same includes an elevated discharge area about an upper rear portion on said harvester. The longitudinal conveyor means 28 includes a conveyor frame structure 30 that includes a first lower conveyor means, indicated generally by the numeral 32, which runs from the lower front portion of the longitudinal conveyor means 28 to the upper rear discharge are thereof. In the embodiment shown, the first lower conveyor means 32 is in the form of a wire chain type conveyor as the same includes a series of rods or links 38 disposed in parallel relationship and extending generally transversely across the conveyor frame assembly 30. For a detailed appreciation of the structure of such a wire chain type conveyor, one is referred to the Pinkham et al U.S. Pat. No. 3,841,071, referred to above and expressly incorporated herein by reference.

The first lower conveyor means 32 includes an upper run 32a and a lower run 32b, and the entire first lower conveyor means 32 is particularly trained about conveyor frame 30 and is continuously driven about a front sprocket means 34 and a second rear sprocket means 36.

Figure 5:
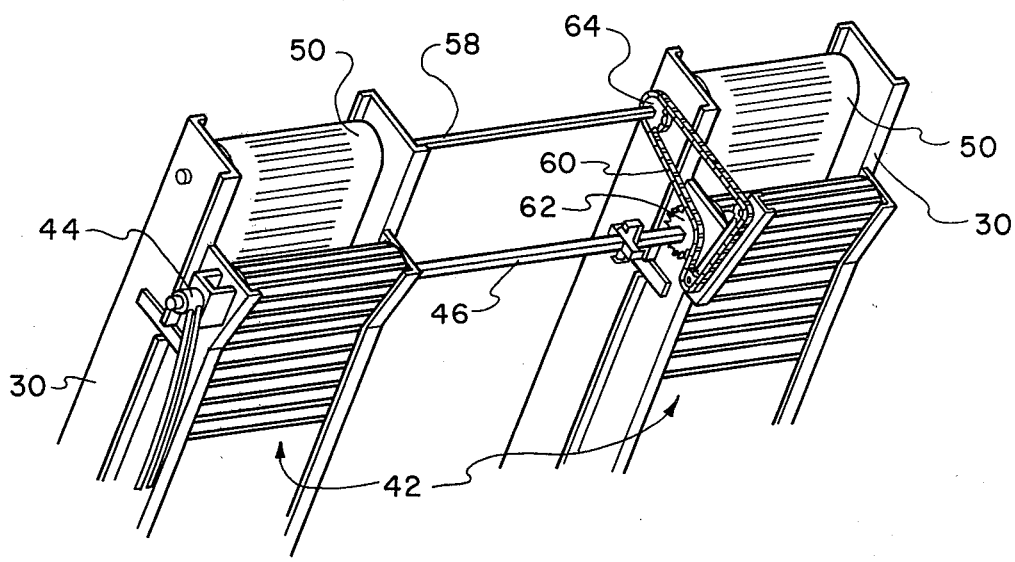
FIG. 5 is a fragmentary perspective view of the rear terminal end portions of two side-by-side leaf elevating conveyor assemblies.

As seen in FIG. 5, the lower conveyor means 32 in a single row harvesting embodiment shown in driven by a hydraulic motor 44 and wherein the driving torque furnished one rear sprocket means 36 is transferred to an adjacent rear sprocket means via a connecting shaft 46, as best viewed in FIG. 5.

As can be seen from the drawings, the first lower conveyor means 32 which in the preferred embodiment shown is in the form of a wire chain type conveyor includes a horizontal section, indicated generally by the numeral 40 that acts to receive defoliated leaves and to convey them generally horizontally from front to rear about the harvester 10, and a leaf elevating section indicated generally by the numeral 42 that forms a part of the leaf elevating conveyor assembly of each longitudinal conveyor means 28 as the same extends generally upwardly, and slightly rearwardly in the case of the embodiment shown to where the same terminates about the rear sprocket means 36.

Cooperable with the leaf elevating section 42 of the first conveyor means 32, is a second conveyor means 48 supported within the longitudinal conveyor frame assembly 30 and disposed generally above and adjacent thereto. Second conveyor means 48 is in the form of a slightly slack belt conveyor 50 that includes a series of transversely extending ridges 52 formed about the outer surface thereof. Belt conveyor 50 is of the endless conveyor type and is trained around lower roller 54 and upper roller 56. The lower or inner run of belt conveyor 50 is driven such that it runs from the lower portion of the longitudinal conveyor means towards the upper elevated leaf discharge end thereof. As viewed in FIG. 5, the upper disposed belt conveyor 50 of each longitudinal conveyor means 28 is driven from the upper roller 56 by a transverse shaft 58 that is driven by a chain 60 trained around sprockets 62 secured to shaft 46 and also trained around sprocket 60 for that is secured to shaft 58. It is appreciated that the desired direction of the conveyor belt 50 is achieved by back wrapping chain 60 about sprocket 62, again as viewed in FIG. 5.

Turning to lower roller 54, it is noted that the same serves as an idler roller for the belt conveyor 50 and consequently is rotatively mounted within mounting means that is supported by the longitudinal conveyor frame assembly 30. Viewing the mounting means in greater detail, as particularly viewed in FIG. 4, it is seen that the same includes a pair of arms 68 and 70 secured to a rock shaft 72 that is rotatively journaled within holding arms 74 and 76, each holding arm being adjustably secured by bolts or other suitable means to the conveyor frame assembly 30 through adjustable slots 78 formed on each side thereof.

To maintain the belt conveyor 50 in proper alignment about the longitudinal conveyor assembly means 28, the mounting means for the lower roller 54 is provided with a pair of laterally spaced guide plates 86 and 88 that generally constrain the conveyor belt 50 to move therebetween and in proper alignment with a lower roller 54 during the leaf elevating and conveying operation. It is also noted that arms 68 and 70 of mounting structure for lower roller 54 is provided with a pair of transverse interconnecting members.

Although the lower end of the belt conveyor 54 could rest directly adjacent the lower first conveyor means 32, it is in some cases desirable to maintain a slight space between the lower terminal end of the belt conveyor 50 and the lower first conveyor means in the area where the tobacco leaves enter therebetween to begin the elevation run. In the case of the mounting structure shown in FIGS. 2, 3 and 4 for the lower roller 54, there is provided a stop 90 on at least one of arms 68 or 70, or on both, with the stop particularly adapted to engage a flat side 30a of an upper or outer edge portion of the longitudinal conveyor frame assembly 30 as best viewed in FIG. 4. It is appreciated that such a stop could be adjustable in order that the entry space between the belt 50 and first conveyor means 32 could be varied.

Figure 8:
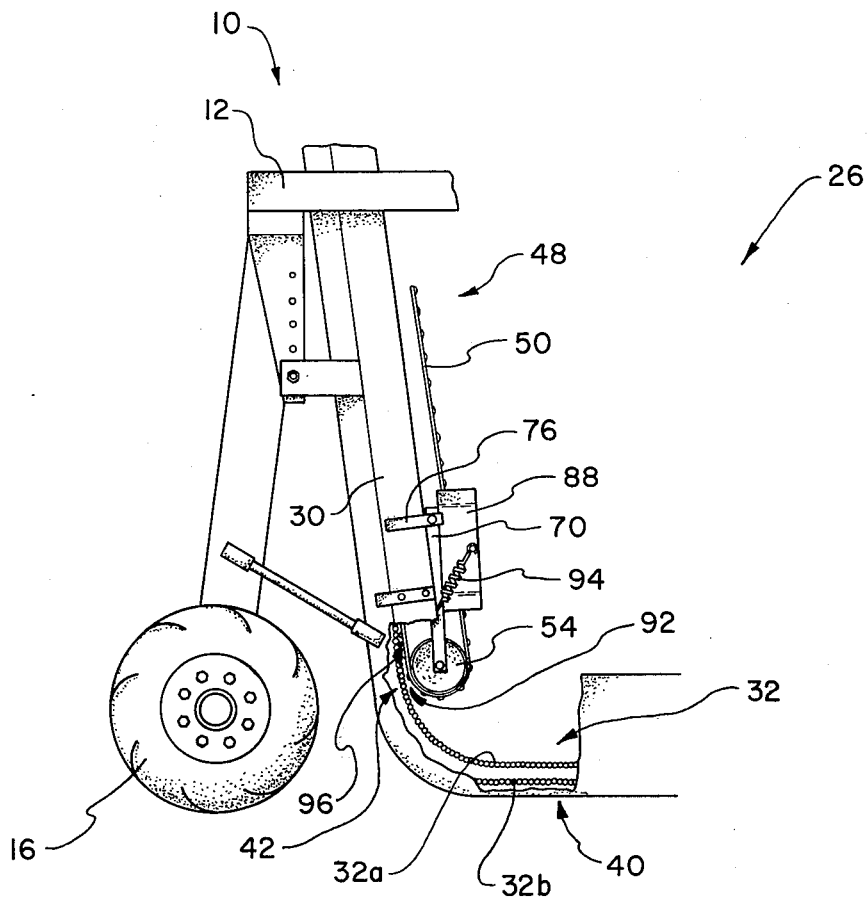
FIG. 8 is a fragmentary side elevational view of another form of the leaf elevating conveyor assembly of the present invention wherein the slope of the leaf conveyor assembly is somewhat steeper than that depicted in FIG. 1.

In the case of the embodiment shown in FIG. 8, it is appreciated that the elevating run of the longitudinal conveyor means 28 is slightly steeper than the embodiment shown in FIG. 1. In this case, it is contemplated that a stop would not be needed because the steepness of the leaf elevating run would generally negate or prohibit substantial wear of the belt at the leaf entry area. Also, in the embodiment shown in FIG. 8, it is seen that the mounting structure for the lower roller 54 is provided with a spring 94 for generally biasing the lower roller 54 back towards the first conveyor means.

Figure 2:
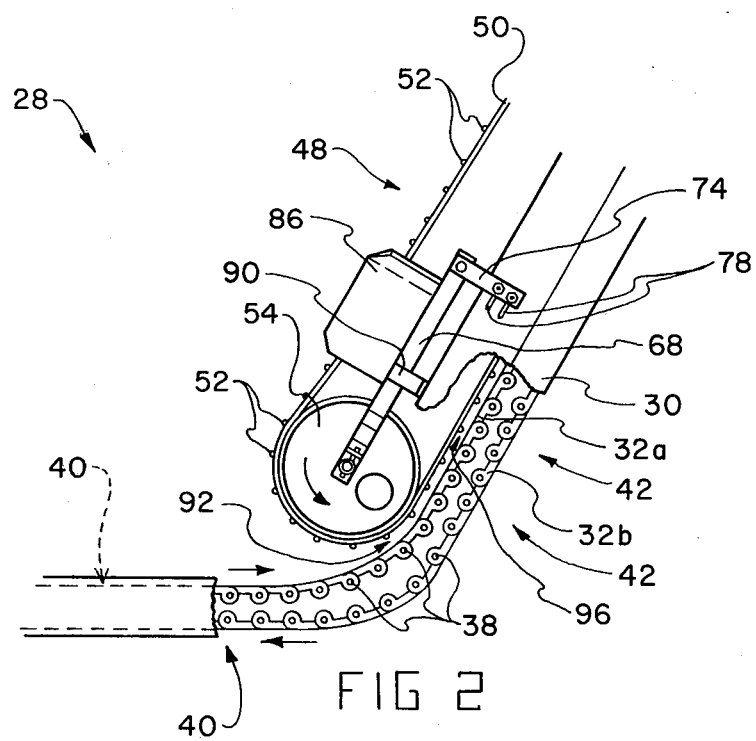
FIG. 2 is a fragmentary side elevational view of the lower forwardmost portion of the leaf elevating conveyor section of the longitudinal conveyor assembly of the present invention, particularly illustrating the upper belt conveyor and lower wire chain type conveyor assembly, and the lower idler roller of said belt conveyor that may float back and forth with respect to said wire chain conveyor in response to various quantities of tobacco leaf material passing thereunder.

Therefore, it is appreciated that the first and second conveyor means 32 and 48 co-act and cooperate to convey and elevate tobacco leaves from a lower level to an upper level on the harvester 10. More particularly, defined between the two conveyor means 32 and 48 and generally between the inner runs thereof is a leaf passing and conveying area indicated generally by the numeral 96. Also, about the lower terminal end of the belt conveyor 50 and between the adjacent upper run of the wire chain conveyor of the first conveyor means 32 is defined a leaf entry area that is indicated generally by the numeral 92 and particularly illustrated in FIGS. 2, 3 and 4. It is seen that the mounting structure provided for the lower roller 54 enables the opening area of the leaf entry area 92 to vary in response to the quantity, size of the wad, or volume of leaves passing thereinto. More particularly, FIG. 2 illustrates the normal area of the leaf entry area 92 and the normal spacing of the lower roller 54 adjacent the upper run of the generally lower disposed wire chain conveyor. In this position, it is quite easy for the normal flow rate of tobacco leaves to pass into the leaf entry area 92 and to continue between the inner runs of the belt conveyor 50 and the wire chain conveyor 32. But as illustrated in FIG. 3, in cases where a large wad or volume, or quantity of tobacco leaf material reaches the leaf entry area 92 at one time, the mounting structure for the lower roller 54 allows the lower roller and the lower terminal end of the belt conveyor 50 to move outwardly from the upper run of the wire chain conveyor 50 to increase the area and leaf receiving area of the leaf entry area 92. It is particularly illustrated that this increase in leaf entry area is response to the quantity of tobacco reaching the lower roller or the leaf entry area 92, as it is the quantity or mass of tobacco that urges the lower roller 54 outwardly, increasing the area of the leaf entry area 92. Also, it should be pointed out that the belt conveyor 50 is slightly flexible in order that the same may bulge due to large quantities or wads of tobacco leaf material passing thereunder. This tends to minimize leaf bruising and leaf damage in the elevating and conveying process.

Figures 6, 7:
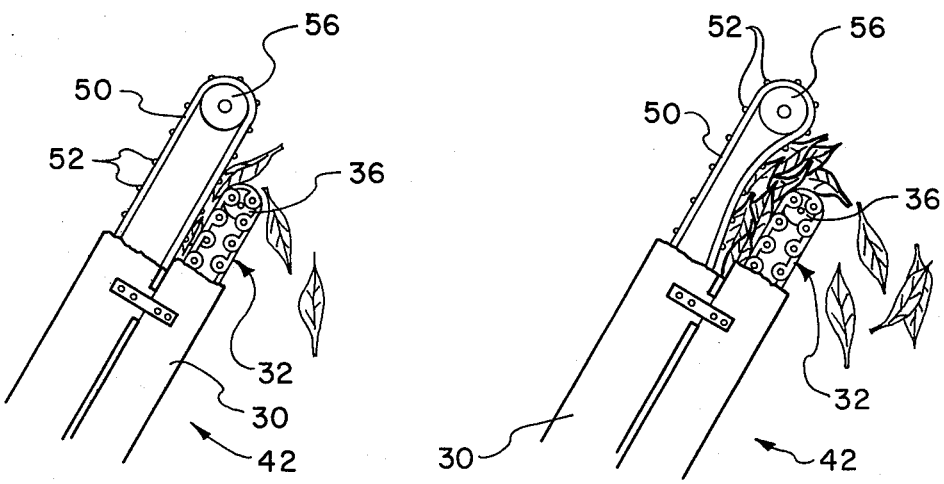
FIG. 6 is a fragmentary side schematic view illustrating the normal manner of discharge of tobacco leaf material from the upper elevated discharge end of a respective leaf elevating conveyor assembly.
FIG. 7 is a view similar to FIG. 6 except therein is shown a relatively large mass or wad of tobacco leaf material being discharged by the leaf elevating conveyor assembly of the present invention and particularly illustrating the manner in which the lower-inner run of the upper belt may flex about the rear elevated terminal end of the wire chain conveyor for allowing the tobacco leaf material to be discharged therefrom.

With respect to FIGS. 6 and 7, the upper elevated discharge end portion of the longitudinal conveyor means is shown, and therein is illustrated the discharge of tobacco leaf material from the longitudinal conveyor means 28. It is seen that the upper roller 56 of the belt conveyor 50 is disposed above the upper rear sprocket means 36 of the first conveyor means 32. This enables wads or large quantities of tobacco leaf material to be discharged from the two cooperative conveyor systems without damaging or bruising the leaf material, especially with regards to abnormally large quantities of tobacco leaf material bunched together, as illustrated in FIG. 7. Here it is seen that the upper roller 56 is so disposed that the slightly slack conveyor belt 50 can flex and bulge in the area adjacent the rear sprocket means 36 of the first conveyor means such that the quantity of tobacco leaf material carried therebetween can be discharged without being compressed such as is the case when the two rollers are disposed directly adjacent each other.

From the foregoing discussion, it is seen that the conveyor system of the present invention for automatic tobacco harvesters, of any type including pull type, presents a highly efficient conveyor means for particularly elevating the tobacco leaf material to an upper elevated discharge area during the tobacco harvesting operation. Also, the particular design of the dual conveyor assemblies for elevating enables dirt and debris to be separated from the tobacco leaf material during the elevating process, while the belt conveyor co-acts in such a manner that a gentle but sufficiently firm positive conveying force is applied to the leaf material traveling about the leaf conveying and passing area 96. Also, the particular design of the present invention, as discussed above, enables the conveyor system, especially along the elevating portion thereof, to efficiently handle relatively large bulk quantities and volumes of tobacco leaf material without bruising or unduly damaging the tobacco leaf material.

The terms "upper", "lower", "forward", "rearward", etc., have been used herein merely for the convenience of the foregoing specification and in the appended Claims to describe the automatic tobacco harvester with improved leaf conveying system and its parts as oriented in the drawings. It is to be understood, however, that these terms are in no way limiting to the invention since the automatic tobacco harvester with improved leaf conveying system may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. In an automatic tobacco harvester of the type having a mobile frame, defoliator means mounted on said mobile frame and carried thereby, and drive means for driving said defoliator means, the improvement comprising a conveyor assembly generally disposed on each side of said defoliator means for receiving leaves defoliated by said defoliator means and conveying said leaves generally rearwardly and upwardly about said harvester where the leaves are discharged therefrom, each conveyor assembly comprising: a conveyor frame structure; a first chain link type conveyor means disposed about said conveyor frame structure and having a generally horizontal conveying section for receiving tobacco leaves and conveying them rearwardly relative to said defoliator means, and a vertical lift section disposed rearwardly of said horizontal conveying sections and having an elevated terminal end; second belt conveyor means disposed adjacent and generally above said vertical lift section of said first chain link type conveyor means and cooperable therewith to convey tobacco leaves therebetween from a lower level relative to said harvester to an upper level where the tobacco leaves may be discharged therefrom; said second belt conveyor means including an endless, flexible and generally slack belt conveyor trained around two independent spaced apart rollers including a lower disposed roller disposed generally adjacent the lower portion of the vertical lift section of said first chain link type conveyor means and an upper roller disposed above and slightly rearwardly of the rear terminal end of said vertical lift section of said first chain link type conveyor means; mounting means movably mounting said lower roller adjacent said first conveyor means for floating back-and-forth bodily movement relative to said first chain link type conveyor means for allowing relatively large masses of tobacco leaves to enter a leaf conveying area defined between the vertical lift section of said first chain link type conveyor means and said second belt conveyor means without clogging or jamming; said mounting means movably mounting said lower roller including a pair of laterally spaced holding arms secured to said conveyor frame structure and extending upwardly therefrom; rock shaft means rotatably secured transversely between said holding arms, a pair of laterally spaced pivot arms secured at one end to said rock shaft means and extending therefrom where the other end of said pivot arms are rotatively connected to said lower roller of said second belt conveyor means such that as pivot arms pivot with said rock shaft means said lower roller moves therewith; stop means mounted on at least one of said pivot arms and engageable with the conveyor frame structure for limiting the movement of said lower roller towards said first conveyor means; a pair of laterally spaced belt guide plates disposed adjacent said lower roller of said second belt conveyor means for guiding said belt conveyor about said lower roller of said second belt conveyor means, each of said guide plates being secured to a respective pivot arm intermediately between said lower roller of said second belt conveyor means and said rock shaft means and extending upwardly therefrom.

2. The improved automatic tobacco harvester of claim 1 wherein said belt conveyor of said second belt conveyor means includes a top run that generally moves downwardly from the upper elevated roller to the lower roller of said second belt conveyor means; and wherein said belt guide plates include a forward flanged edge that is directed outwardly with each flanged edge being formed about the upper side of said belt guide plate as disposed on said tobacco harvester so as to face the downwardly oncoming top run of said second belt conveyor.

3. The improved automatic tobacco harvester of claim 1 wherein said conveyor frame structure is provided with elongated slots through which said holding arms are secured in order that said holding arms and mounting means for movably mounting said lower roller of said second belt conveyor means can be adjusted relative to said conveyor frame structure.

* * * * *